Nov. 18, 1969     F. F. DE SMEDT     3,479,426
PROCESS FOR MAKING ISOTROPIC POLYMERIC FILM
Filed Nov. 25, 1966
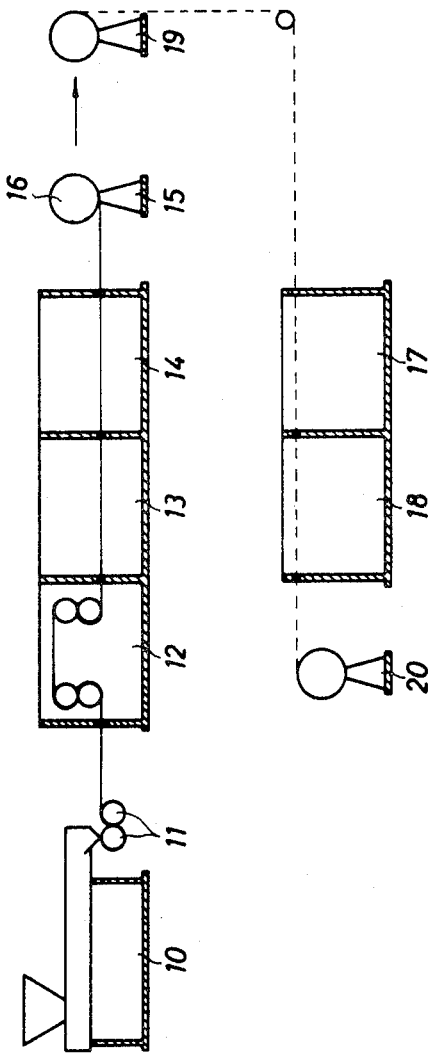
INVENTOR
Felix Frederick De Smedt
BY
Watson, Cole, Grindle &d Watson
ATTORNEY

United States Patent Office 3,479,426
Patented Nov. 18, 1969

3,479,426
PROCESS FOR MAKING ISOTROPIC POLYMERIC FILM
Felix Frederik De Smedt, Wilrijk-Antwerp, Belgium, assignor to Gevaert-Agfa N.V., Mortsel, Belgium, a Belgian company
Filed Nov. 25, 1966, Ser. No. 597,082
Claims priority, application Great Britain, Nov. 26, 1965, 50,443/65
Int. Cl. B29d 7/24
U.S. Cl. 264—289            5 Claims

ABSTRACT OF THE DISCLOSURE

A biaxially oriented linear polyester film which after biaxial stretching is heat treated while moving in one linear direction and restrained against shrinkage, is heat set at a temperature at least 10° higher than the heat treatment temperature while moving in the opposite linear direction and restrained against shrinkage, the reverse direction of the heat setting step counteracting at least in part the variation in film properties caused by the tendency of the center region of the film to lag the edge regions thereof during heat treatment and resulting in a film having more uniform properties across its width.

---

This invention relates to an improved process for making biaxially oriented organic polymer film. The invention is particularly valuable in orienting films composed of an orientable, crystallizable, linear polyester.

A great many linear, synthetic, organic polymers such as polyethylene terephthalate are capable of being transformed into translucent or transparent films having excellent physical properties. Some of these properties e.g. tensile strength, impact resistance, flexional strength, etc. can be improved further by molecular orientation. For instance, a polyethylene terephthalate film that has been stretched biaxially, e.g. stretched in two directions perpendicular to each other, is a material offering many possibilities owing to its excellent physical properties and its remarkable resistance to chemical degradation. When these oriented films are heat-treated at high temperatures, say above 100° C., they show a high degree of dimensional stability and of tensile strength at elevated temperatures up to the temperatures of the heat treatment.

In the classical process for the production of a biaxially oriented, crystallizable, thermoplastic, organic polymer film, such as a polyethylene terephthalate film, the film being in a considerably amorphous state, is first stretched longitudinally (in the direction of the extrusion) to the desired extent between rollers rotating at different speeds. Then, the film is stretched transversally in a transverse stretching device comprising means for engaging the edges of the film and making them follow diverging paths, and after this transverse stretching the film is heat set.

Sometimes, while the lateral stretching of a longitudinally stretched web of polyester film is taking place, the central portion of the web tends to lag behind the edges of the film, which are guided under tension, and a uniform balance of properties across the web is not attained.

After biaxially stretching, the web is passed into a heat-setting zone maintained at a temperature which is between 30 and 140° C. higher than that in the lateral stretching zone, but lower than that of the melting temperature of the polymer. It is found that as a result of the passage of the film into the heat-set zone, lagging of the central portion of the film occurs to a marked extent so that even if lagging does not occur during stretching, the final film does not have balanced properties and if lagging already occurs during stretching this lagging becomes increased. The lack of balance is not reduced if the heat-set film is subsequently subjected to a heat-relaxing step.

Although the phenomenon of lagging does not constitute a serious problem for webs of smaller width, it is found in practice that webs of greater width, say up from 70 cm., show an undesirable imbalance in the tensile characteristics particularly when measuring them according to the main directions of orientation.

In other words, when oriented polymer films of such larger widths are produced it is anisotropic in its mechanical properties.

The present invention is based on a new principle, viz. the reversal of the film motion after stretching so that what was formerly the trailing end of the film is the first to enter the heat-setting zone. When conducting the reversely travelling film through the heat-setting zone with the margins of the film gripped and following parallel paths, lagging of the central portion of the film occurs towards that end of the film which leads its motion during stretching.

Thus, by means of the invention it is possible to produce film wherein the lagging is slightly "negative," i.e., wherein the central portion of the web considered along any notional transverse line of the web prior to stretching, becomes during the subsequent treatments, displaced with respect to the marginal portions of the film on such line, in a direction towards the end of the film which leads the film motion during the stretching operation. Such a state of "negative" lagging may lead in some cases to film which has more balanced properties and which is less anisotropic than would be the case were the lagging to be zero.

However the invention is preferably embodied in a process in which the film is subjected after stretching and before its reversed motion to an intermediate treatment as will hereafter be referred to whereby the central portion of the film is caused to lag in the direction opposite to that in which the lagging subsequently occurs during heat-setting. If lagging already occurs during stretching, this lagging is increased by the intermediate treatment. By adopting a said intermediate treatment, it is possible to produce a film which in the final analysis is substantially isotropic, the anisotropy at any point of the film being smaller than 1.1. The invention is in all cases more particularly intended for use in relation to films with a width of 70 cm. or more.

The anisotropy at a given point of the film will be expressed hereinafter by the ratio of the Young's moduli $ER_1$ and $ER_2$ measured according to the main directions of orientation $R_1$ and $R_2$ of the film. The main directions of orientation are the directions of extinction as they may be determined by means of a polariscope. Since $R_1$ and $R_2$ are normal to each other, only the angle between $R_1$ and the longitudinal direction of the film will be given hereinafter.

The intermediate treatment for causing or accentuating initial lag comprises passage of the film into a zone (hereafter called the "heat-shrinking zone") wherein the margins of the film are gripped and advanced in parallel at the speed of their travel from the stretching zone, and wherein the temperature is equal to or higher than the temperature in the transverse stretching zone but at least 10° lower than the eventual heat-setting temperature.

Thus, preferred processes according to the invention for making isotropic polymeric film from an unorientated film composed of an orientable, crystallizable, linear, organic polymer, comprises:

(a) stretching the film biaxially while it is moving in a given longitudinal direction,
(b) passing said stretched film into a "heat-shrinking zone" as above referred to,
(c) conducting the film in a reversed condition (i.e., the former leading end of the film now trailing) through a heat-setting zone while gripping and advancing the film margins in parallel.

When performing such a process it is a straight forward matter to control the temperatures in steps (b) and (c) so that the final film is substantially isotropic.

Following step (b) the film may be fed into or onto a storage means, e.g., it may be wound into a roll.

The invention is particularly useful in making oriented polyester films, and especially polyester films containing at least 80% of recurring units of ethylene terephthalate, of a thickness of 0.05 to 0.6 mm., which films are to be used as a support for photographic light-sensitive film sheets that must show excellent dimensional stability, e.g. film for aerial photography.

The films to be treated in accordance with the present invention may have a transverse profile of even thickness, or be provided with beaded edges when extruded, for facilitating the engaging of the film edges by the means for transversely stretching the film.

The biaxially stretching of the film can be carried out by separately, longitudinally and transversely stretching the film or by stretching the film simultaneously in said two directions.

The engaging of the edges of the film for stretching it in the transverse direction may be performed in a known way by means of grippers travelling with the film, by a plurality of stationary idler rollers positioned along diverging paths, by two diverging guide frames provided with a continuous slot sized to receive a beaded edge of the film with its bead constrained behind said slot, etc.

Preferably, the step (b) of heat-shrinking the film is performed immediately after the step (a) so that the film is not allowed to cool between both zones. In practice the said condition will be most easily performed, when making the means engaging the edges of the film in the stretching zone follow parallel paths after their diverging paths, and when maintaining in said zone of parallel paths the required temperature conditions. Preferably, the temperature in said heat-shrinking zone is approximately 0° to 40° C. higher than that in the zone of transverse stretching.

Between steps (b) and (c) the film may be stored in a festoon type storage system. In such a system the edges of the film need not be trimmed off. The latter operation is almost imperative if the film is to be wound up on a roll, since the film edges, which have not been stretched to the same extent as the body portion of the film and which are deformed thereby, tend to wrinkle and do not permit thereby a convenient winding up of the film.

Moreover, for carrying out the step (c) of heat-setting the film, the film edges must be gripped again, and if the edges have already been severed from the film after step (b), there would be a double loss of material if it proved necessary to subsequently to sever the edges after step (c). However, any means for temporarily holding the film following step (b) until the desired length of film has left that step, may be used.

The process according to the present invention is illustrated by reference to the attached diagrammatic drawing.

For the sake of simplicity, the step of severing the edges of the film will be omitted from the further description.

Referring to the drawing, in an exemplary procedure a polyethylene terephthalate film is extruded by an extruder 10, passed over the cooling rollers 11 through the longitudinal stretching zone 12 wherein it is maintained at a temperature from 70° to 120° C., through a transverse stretching zone 13 at a temperature from 70° to 120° C., through the heat-shrinking zone 14 at a temperature from 70° to 220° C., and thence to a wind-up station 15.

When a sufficient length of film has been wound-up, the film is severed, and the film roll 16 is removed from the wind-up station and transported to an unwind station 19 where it is continuously unwound and passed (shown in broken lines) through a heat-setting zone 17 at a temperature from 150° to 230° C., to a wind-up station 20. The removed roll 16 is immediately replaced by an empty roller in the wind-up station 15, so that the different operations can go on continuously.

Occasionally the film may be heat-relaxed in a zone 18 before it is wound up at the station 20, but it is obvious that the step of heat-relaxing makes no integral part of the invention process, since the isotropy of the film as obtained according to said process, is not improved by said step of heat-relaxing.

Preferably, an installation for performing the inventive process, will be provided with at least two storing means for storing film after step (b) and which automatically operating cutting, grinding and splicing means, which when a length of film has passed from step (b) into the first storing means and filled it, cuts the film, guides the following length of film from step (b) into the second storing means, removes the film from the said storing means in the reverse direction and directs it into the zone for performing the step (c), and joins the trailing end of the length of film leaving one storing means to that end of the length of film, on the other storing means which is to lead the motion of such film length. In such a way, to step (c) the production of the film can go on continuously.

The invention is illustrated but not limited by the following examples.

EXAMPLE 1

A non-oriented polyethylene terephthalate film being extruded through a slit having a length of 300 mm. and a uniform width of 2 mm. is longitudinally stretched first 3.9 times at a temperature of 87° C. and at a speed of 15.000% per min., and then transversely stretched 3.5 times at a temperature of 80° C. and at a speed of 150% per minute. The biaxially stretched film is then heat-set at a temperature of 200° C. for 45 sec.

A second sample of the same film is biaxially stretched as described above and thereafter treated according to the invention by first heat-shrinking it at a temperature of 95° C. for 45 sec., and winding it up on a roll. Thereafter the roll is removed and taken to another apparatus where the film is unwound continuously from the roll and heat-set at a temperature of 200° C. for 45 sec., the direction of travel of the film during said operation being reversed, of course, to that during the step of heat-shrinking.

A comparison between the characteristics of both samples is given in Table I hereinafter. Columns 2, 3 and 4 indicate, respectively, the lagging as measured after heat-shrinking (sh.), the lagging caused by heat-setting (se.) in case the film has been heat-shrunk first or the lagging measured after heat-setting in case the film is heat-set immediately after the transverse stretching, and the total lagging of the oriented film. The lagging is expressed as a fraction of L, L being the net width of the stretched film. A negative value points to an advanced position of the central portion of the film in respect of the edges (considered in a direction towards the end of the film which leads its travel through the stretching zones), whereas a positive value points to a corresponding trailing position.

Columns 5, 6 and 7 indicate the deviation of the main direction $R_1$ of orientation of the film from the longitudinal direction in degrees at the left (l.), the middle (m.) and the right (r.) of the film, respectively.

Columns 8, 9 and 10 indicate the anisotropy by the ratio of the Young's moduli, measured as described hereinbefore, at the left, the middle and the right of the film, respectively.

EXAMPLE 2

A non-oriented polyethylene terephthalate film being extruded through a die slit having a length of 300 mm. and a uniform width of 2 mm., is first longitudinally stretched 3.85 times at a temperature of 87° C. and at a speed of 15.000% per min., and then transversally stretched 3.34 times at a temperature of 80° C. and at a speed of 150% per min. The biaxially stretched film is then heat-set for 45 sec. at a temperature of 195° C.

A second sample of the same film is biaxially stretched as described above and then passed into a separate zone as shown, in which it is kept at a temperature of 60° C. during 45 seconds. Then the film was heat-set for 45 seconds at 195° C.

A third sample of the film is stretched biaxially as described above and then passed into a separate zone, wherein it is kept at a temperature of 95° C. for 45 sec. Then the film is heat-set at 195° C. for 45 seconds.

A fourth sample of the film is treated according to the invention by biaxially stretching it as described above, then heat-shrinking it at a temperature of 95° C. for 45 seconds, and storing it up. Then the film is taken off in the reverse direction and heat-set at a temperature of 195° C. for 45 seconds.

A comparison between the characteristics of the four samples is given in Table II hereinafter.

EXAMPLE 3

A non-oriented polyethylene terephthalate film being extruded through a nozzle with an opening of 200 x 1 mm., is first longitudinally stretched 3.85 times at a temperature of 87° C. at a speed of 20.000% per minute, and then transversely stretched 3.5 times at a temperature of 80° C. and at a speed of 200% per minute. The biaxially stretched film is then heat-set at a temperature of 200° C. for 45 seconds.

A second sample of the same film is biaxially stretched as described above, and then passed into a separate zone in which it is maintained at a temperature of 102° C. during 45 seconds. Then the film is heat-set at a temperature of 200° C. during 45 seconds.

A third sample of the same film is treated according to the invention by biaxially stretching it as described above, heat-shrinking it at a temperature of 102° C. for 45 seconds, and storing it up. Thereafter the film unwound in the reverse direction and heat-set at a temperature of 200° C. during 45 seconds. A comparison between the characteristics of the three samples is given in Table III hereinafter.

EXAMPLE 4

A non-oriented polyethylene terephthalate film being extruded through a slit having a length of 480 mm. and a uniform width of 2 mm., is first longitudinally stretched 3.72 times at a temperature of 87° C. and at a speed of 14.200% per min. and then transversely 3.5 times at a temperature of 80° C. and at a speed of 110% per minute. The biaxially stretched film is then heat-set at a temperature of 200° C. for 45 seconds.

A second sample of the same film is treated according to the invention by biaxially stretching it as described above, heat-shrinking it at a temperature of 90° C. for 45 seconds, and storing it up. Then the film is unwound in the reverse direction and heat-set at a temperature of 200° C. for 45 seconds.

TABLE I

| Film | Lagging in L | | | Deviation of $R_1$ | | | $ER_1/ER_2$ | | |
| --- | --- | --- | --- | --- | --- | --- | --- | --- | --- |
| | Sh. | Se. | Total | l. | m. | r. | l. | m. | r. |
| 1 | | 0.05 | 0.05 | 07.5 | 0 | 37 | 1.29 | 1.01 | 1.28 |
| 2 | 0.021 | −0.032 | −0.011 | 19.5 | 23 | 15.5 | 1.03 | 1.04 | 1.03 |

TABLE II

| Film | Lagging in L | | | Deviation of $R_1$ in ° | | | $ER_1/ER_2$ | | |
| --- | --- | --- | --- | --- | --- | --- | --- | --- | --- |
| | Sh. | Se. | Total | l. | m. | r. | l. | m. | r. |
| 1 | | 0.047 | 0.047 | 41 | 0 | 41 | 1.25 | 1.00 | 1.25 |
| 2 | | 0.015 | 0.015 | 34 | 0 | 33 | 1.13 | 1.02 | 1.14 |
| 3 | | 0.038 | 0.038 | 38 | 0 | 38 | 1.19 | 1.02 | 1.18 |
| 4 | 0.022 | −0.030 | −0.008 | 26 | 21.5 | 24 | 1.01 | 1.02 | 1.02 |

TABLE III

| Film | Lagging in L | | | Deviation of $R_1$ in ° | | | $ER_1/ER_2$ | | |
| --- | --- | --- | --- | --- | --- | --- | --- | --- | --- |
| | Sh. | Se. | Total | l. | m. | r. | l. | m. | r. |
| 1 | | 0.052 | 0.052 | 43 | 0 | 43 | 1.30 | 1.01 | 1.29 |
| 2 | | 0.042 | 0.042 | 44 | 0 | 43 | 1.21 | 1.02 | 1.23 |
| 3 | 0.032 | −0.032 | 0 | 20 | 25 | 18 | 1.02 | 1.00 | 1.03 |

TABLE IV

| Film | Lagging in L | | | Deviation of $R_1$ in ° | | | $ER_1/ER_2$ | | |
| --- | --- | --- | --- | --- | --- | --- | --- | --- | --- |
| | Sh. | Se. | Total | l. | m. | r. | l. | m. | r. |
| 1 | | 0.082 | 0.082 | 36 | 0 | 31 | 1.49 | 1.02 | 1.53 |
| 2 | 0.022 | −0.027 | −0.005 | 25 | 30 | 30 | 1.04 | 1.03 | 1.04 |

EXAMPLE 5

A non-oriented polyethylene terephthalate film being extruded through a die having a length of 480 mm. and a uniform width of 2 mm. is first longitudinally stretched 3.72 times at a temperature of 87° C. and at a speed of 14.200% per min. and then transversely stretched 3.5 times at a temperature of 80° C. and at a speed of 110% per min. The biaxially stretched film is then heat-set at a temperature of 195° C. for 45 seconds.

A second sample of the same film is biaxially stretched as described above and then passed into a separate zone in which it is kept at a temperature of 60° for 45 seconds. Then the film is heat-set at 195° C. for 45 seconds.

A third sample of the film is biaxially stretched as described above and then passed into a separate zone where it is kept at a temperature of 90° C. for 45 seconds. Then the film is heat-set at 195° for 45 seconds.

A fourth sample of the film is treated according to the invention by biaxially stretching it as described above, heat-shrinking it at a temperature of 90° C. for 45 seconds, and storing it up. Then the film is unwound and heat-set for 45 seconds at a temperature of 195° C.

A comparison between the characteristics of the four samples is given in Table V hereinafter.

What we claim is:

1. A process of producing an oriented linear polyester film having more uniform properties across its width which comprises the steps of:
   (a) advancing a length of unoriented film of orientable, crystallizable linear polyester through a stretching zone where the film is stretched both longitudinally and transversely of its direction of movement at a temperature within the range of 70–120° C. to biaxially orient the same;
   (b) feeding the biaxially oriented film at substantially the same speed as it emerges from said stretching zone through a heat treating zone to heat the film to a temperature within the range of 70–220° C. and at least as high as the temperature of said film during transverse stretching thereof, while restraining the film edges to preclude significant transverse shrinkage of the film;
   (c) winding the heat-treated film from step (b) into a roll; and
   (d) unwinding the film from said roll and passing the unwound film through a heat setting zone to heat the film to a temperature within the range of

TABLE V

| Film | Lagging in L | | | Deviation of $R_1$ in ° | | | $ER_1/ER_2$ | | |
|---|---|---|---|---|---|---|---|---|---|
| | Sh. | Se. | Total | l. | m. | r. | l. | m. | r |
| 1 | | 0.075 | 0.075 | 32 | 0 | 32.5 | 1.46 | 1.03 | 1.47 |
| 2 | | 0.041 | 0.041 | 35.5 | 0 | 35.5 | 1.34 | 1.02 | 1.28 |
| 3 | | 0.059 | 0.059 | 38.5 | 0 | 33 | 1.43 | 0.02 | 1.42 |
| 4 | 0.022 | −0.026 | −0.004 | 25 | 25 | 29 | 1.09 | 1.03 | 1.09 |

EXAMPLE 6

A non-oriented polyethylene terephthalate film being extruded through a nozzle showing an opening of 480 x 2 mm., is first longitudinally stretched 3.72 times at a temperature of 87° C. and a speed of 18.500% per min. and then transversely stretched 3.45 times at a temperature of 80° C. and at a speed of 144% per minute. The biaxially stretched film is then heat-set for 45 seconds at a temperature of 205° C.

A second sample of the same film is biaxially stretched as described above and then passed into a separate zone for 45 sec. at a temperature of 90° C. Then the film is heat-set for 45 sec. at a temperature of 205° C.

A third sample of the same film is treated according to the invention by biaxially stretching it as described above, thereafter heat-shrinking it for 45 seconds at a temperature of 90° C., and storing it up. Then the film is taken off and heat-set for 45 seconds at a temperature of 205° C. A comparison between the characteristics of the three samples is given in Table VI hereinafter.

150°–230° C. and at least 10° C. higher than the heat treatment temperature of step (b) but below the melting temperature thereof, while restraining the film edges to preclude significant transverse shrinkage of the film.

2. A process according to claim 1 wherein the step of heat-treating the film is performed immediately after the step (a), so that the film is not allowed to cool between both steps.

3. A process as defined in claim 1, wherein in step (b) the film is maintained at a temperature being 0° C. to 40° C. above the temperature at which the film is transversely stretched.

4. A process as defined in claim 1 which includes the further step of heat-relaxing the heat-set film.

5. A process as defined in claim 1 wherein said or-

TABLE VI

| Film | Lagging in L | | | Deviation of $R_1$ in ° | | | $ER_1/ER_2$ | | |
|---|---|---|---|---|---|---|---|---|---|
| | Sh. | Se. | Total | l. | m. | r. | l. | m. | r. |
| 1 | | 0.085 | 0.085 | 35 | 0 | 35.5 | 1.51 | 1.03 | 1.55 |
| 2 | | 0.06 | 0.06 | 38 | 0 | 38 | 1.44 | 1.01 | 1.43 |
| 3 | 0.022 | −0.028 | −0.006 | 29 | 30 | 31 | 1.03 | 1.01 | 1.04 | ganic polymer is a polyester containing at least 80% of recurring units of ethylene telephthalate.

References Cited

UNITED STATES PATENTS

| | | | |
|---|---|---|---|
| 2,968,067 | 1/1961 | Long | 264—289 |
| 3,150,995 | 9/1964 | Bauer | 17—138.8 |
| 3,257,489 | 6/1966 | Heffelfinger | 264—289 |
| 3,257,490 | 6/1966 | Hovermale et al. | 264—289 |

JULIUS FROME, Primary Examiner

HERBERT MINTZ, Assistant Examiner

U.S. Cl. X.R.

264—234, 288, 342, 345